Nov. 29, 1960
A. HIRSCH
2,962,080
APPARATUS FOR PRODUCING REINFORCED COMPOSITE LAYER MATERIAL
Filed Dec. 12, 1956
4 Sheets-Sheet 1
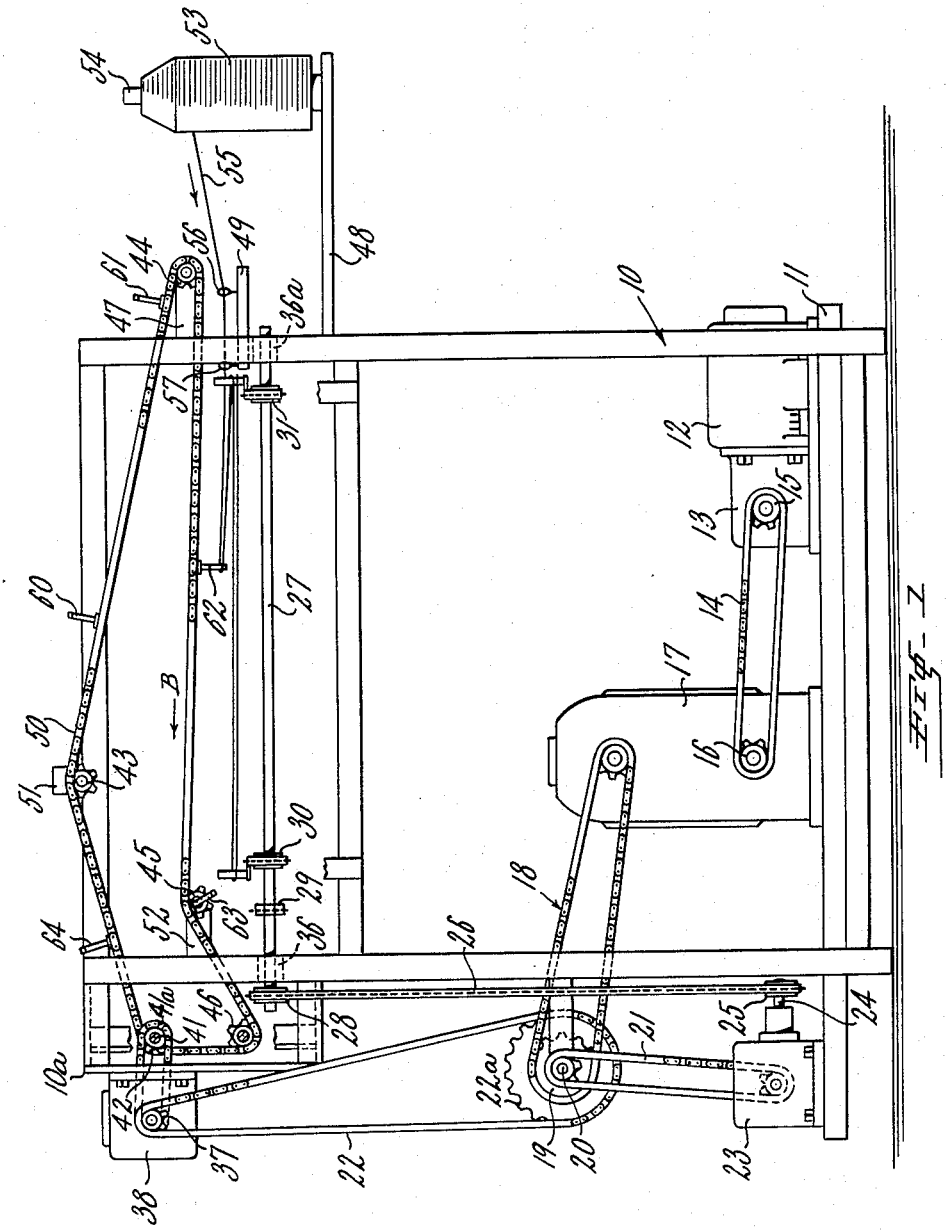
INVENTOR.
ARTHUR HIRSCH
BY

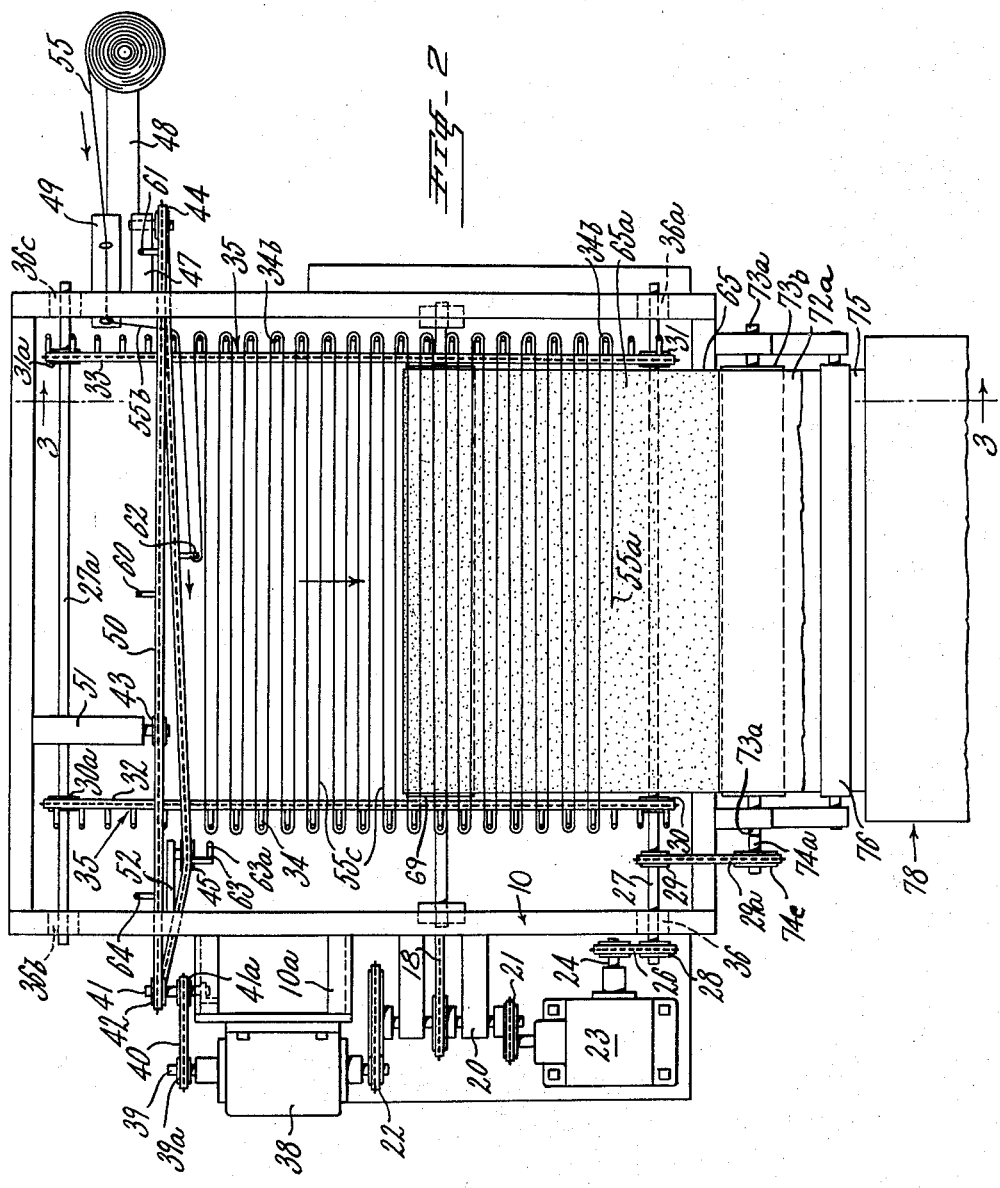

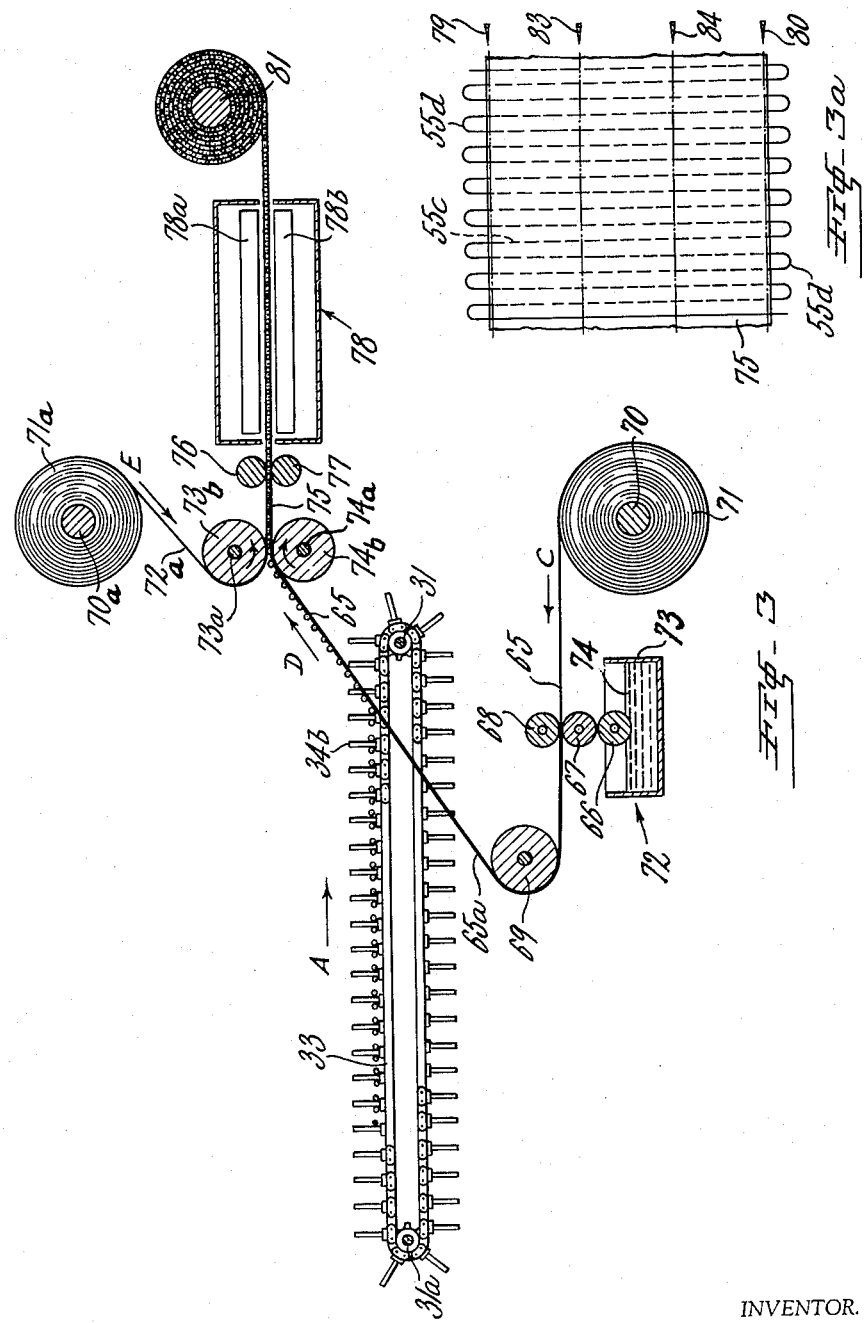

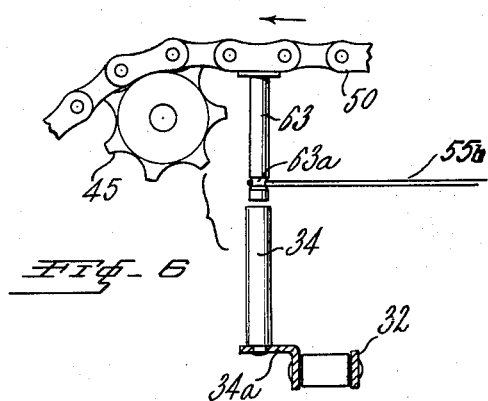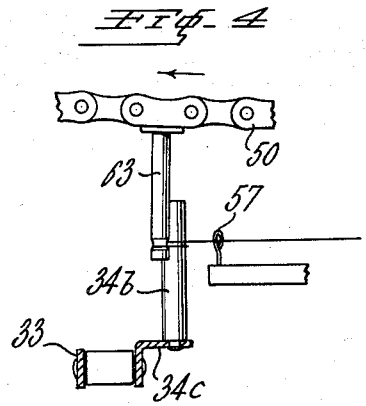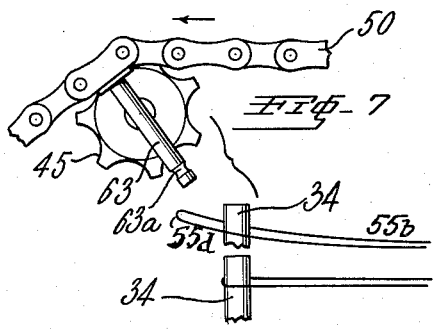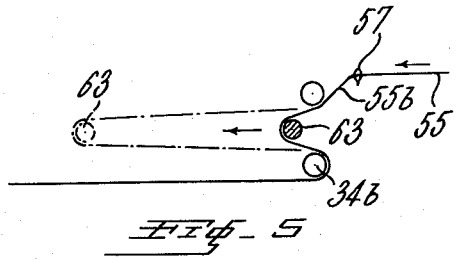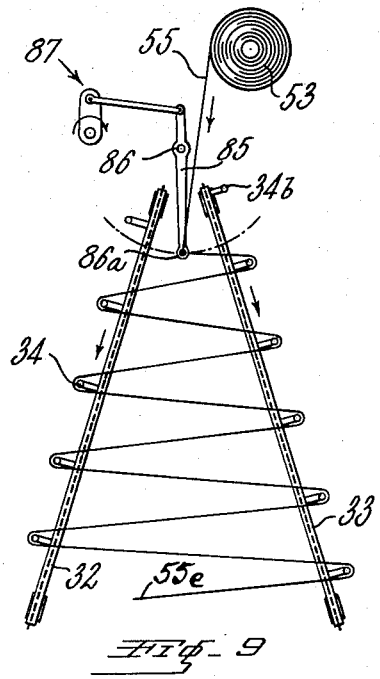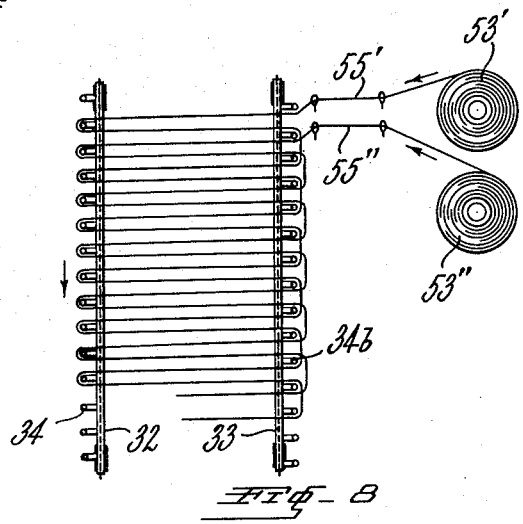
INVENTOR.
ARTHUR HIRSCH

United States Patent Office 2,962,080
Patented Nov. 29, 1960

2,962,080

APPARATUS FOR PRODUCING REINFORCED COMPOSITE LAYER MATERIAL

Arthur Hirsch, Elizabeth, N.J., assignor to General Gummed Products, Inc., Linden, N.J.

Filed Dec. 12, 1956, Ser. No. 627,856

4 Claims. (Cl. 154—1.7)

This invention relates to reinforced composite layer material and more particularly to the method and means of producing the same.

It is one of the primary objects of the invention to provide means facilitating the production of reinforcement means for one or more paper layers and to unite said reinforcement means with the latter in a continuous operation.

It is another object of the present invention to provide means affording the construction of a compact and highly efficient machine for directing reinforcement means in the form of thread or threads for incorporation in a composite layer material.

Still another object of the present invention is to provide means envisaging the discharge of reinforcing means onto composite strip material while the same is moved past said machine.

Yet a further object of the present invention is to provide means permitting the disposition of the reinforcement means in any selected, predetermined fashion and in accordance with the approximate width of the composite paper or other tape material with which said reinforcement means may be united to obtain a highly uniform and desirable product, which is suitable for use in fabricating cartons, to seal the seam of such cartons, or to be applied as a stay strip to such cartons or containers of cardboard or corrugated board and the like.

It is still a further object of the present invention to provide means rendering the possibility of applying any type of thread-shaped reinforcing means to the layer formation of a tape or strip-like material while the latter is being moved past said reinforcing means in a continuous manner.

Still a further object of the present invention is to provide means conducive to the manufacture of reinforced laminated strip material made from paper or the like which withstands high tearing stresses and to which thread-shaped reinforcing means is continuously supplied commensurate with and in timed relation to supply of the layer material to be reinforced.

It is still a further object of the present invention to provide means imparting to the layers of the composite strip material the capacity for easily conforming said material to the contour of the surface to which it is to be applied without causing any surface tension on said layers and permitting said layers to remain in close position to each other and undisplaced with respect to the reinforcing means sandwiched therebetween.

Yet a further object of the present invention resides in the provision of means conducive to a novel, improved and speedy process which results in a laminated paper or tape structure in which reinforcing means may be evenly and regularly (in equal convolutions or undisturbed predetermined fashion) incorporated in parallel or oblique spaced strata, selectively.

Still another object of the invention is to provide means contributing to a fully automatic operating machine which directs the component parts to follow operational steps so as to be discharged as a tape product in reinforced condition, either gummed or plain, as desired.

These and other objects and advantages of the invention will become further apparent from the following detailed description, reference being made to the accompanying drawings showing preferred embodiments of the invention.

In the drawings:

Fig. 1 is a front elevational view of a machine for the production of reinforced layer, strip or sheet material according to the invention, the source of the starting material being omitted;

Fig. 2 is a top plan view of the machine shown in Fig. 1;

Fig. 3 is a diagrammatic longitudinal sectional view of the machine of Figs. 1 and 2, the view being taken along the line 3—3 of Fig. 2;

Fig. 3a is a plan view of a piece of reinforced layer material as formed in the machine of Fig. 3;

Fig. 4 to 7, inclusive, show parts of the machine of Fig. 1 in various positions of operation, Fig. 5 showing a schematic view of the transverse feed of a reinforcing thread;

Fig. 8 shows a top plan view similar to that of Fig. 2 but modified for a multiple thread supply, other machine parts seen in Fig. 2 being omitted; and Fig. 9 shows a top plan view similar to that of Figs. 2 and 8 but modified as to the manner of feeding the reinforcing thread.

Referring now more particularly to Figs. 1 and 2 of the drawings, the machine according to the invention comprises frame 10 having a base 11 which supports a motor 12 to which a gear box 13 is connected. A chain drive 14 connects a sprocket 15 of the gear box 13 with a sprocket 16 of a speed changer 17 which in turn imparts rotation via a chain drive 18 to a sprocket wheel 19 seated on a countershaft 20.

The shaft 20 is operatively connected through a chain drive 21 to a gear box 23 which has a shaft 24 supporting a sprocket wheel 25 for a chain drive 26, the latter being operatively connected with the main drive shaft 27 via a sprocket wheel 28. The main drive shaft 27 is journaled at 36 and 36a in the frame 10 of the machine and carries sprocket wheels 29, 30 and 31. Sprocket wheels 30 and 31 are operatively connected to sprockets 30a and 31a via chain drives 32 and 33 which together constitute a longitudinal thread feed mechanism generally designated by numeral 35. Sprocket wheels 30a and 31a are mounted on a shaft 27a which is journaled in the frame at 36b and 36c.

A further chain drive 22 driven by a sprocket 22a on shaft 20 is operatively connected with a speed multiplier 38 through the intermediary of a sprocket wheel 37. An output shaft 39 of the speed multiplier 38 carries a sprocket wheel 39a which is operatively connected via a chain drive 40 to a sprocket wheel 41a seated on a shaft 41 which also carries a sprocket wheel 42.

Over sprocket wheel 42 is trained a chain drive 50 which additionally engages an idler sprocket wheel 43 supported by a frame bracket 51, a further sprocket wheel 44 supported by a frame bracket 47, a deviatory or chain-deflecting sprocket wheel 45 supported by a frame bracket 52, and a sprocket wheel 46 rotatably supported on a frame extension 10a to which the speed multiplier 38 is bolted or otherwise attached. Chain drive 50 constitutes a transverse thread feed mechanism which operates in a direction crosswise to the aforesaid longitudinal feed mechanism 35.

The transverse feed chain 50 is driven at an increased speed through the speed multiplier device 38 with which it is operatively connected via chain drive 40. The chain 50 carries, on brackets similar to the brackets 34a and 34c, a plurality of spaced apart pins 60, 61, 62, 63 and 64, each of these being provided at its free end with a circumferential groove, such as 63a shown on pin 63 in Fig. 6.

As can be further seen from Fig. 1, a bracket 48 extending from the frame 10 carries a supply roll or spool of thread which is rotatable about a spindle 54, the reinforcing thread 55 being fed through guide eyes 56 and 57 mounted on a further frame bracket 49.

In accordance with the fundamental principle of the present invention, the thread 55 is to be continuously looped around pins and stretched across the longitudinal feed mechanism 35. To this end, the chain 32 is provided with a plurality of loop-supporting pins 34 which are fixed to brackets 34a extending laterally from the links of the chain, the pins 34 extending laterally from the links of the chain, the pins 34 extending substantially perpendicularly to the direction of movement of the chain 32. A different angular disposition of these pins relative to the chain may, of course, be employed without involving any departure from the spirit of the invention.

Similarly, the chain 33 is provided with loop-supporting pins 34b supported on brackets 34c fixed to and extending laterally from the links of the chain 33. The angular disposition of the pins 34b with respect to the chain 33 may be the same as or different from the angular disposition of the pins 34 with respect to the chain 32.

When it is desired to initiate the passing of the thread across the longitudinal feed mechanism 35, the free end 55a of the thread may be brought into contact with and thus attached to the adhesive surface 65a of carrier or strip 65, as hereinafter referred to or thread end 55a is grasped by the operator after the motor 12 was set in operation by any suitable switch or other actuating means (not shown). Merely by way of example, the thread end 55a can be directed in a straight line from the guide eye 57 to extend for a certain distance across the space between the chains 32 and 33. Although in Fig. 2, for the sake of clarity, the thread end 55a is shown as extending only about half way across the aforesaid space, it is readily evident that it will generally be simpler to extend the thread until the end 55a is located at the corresponding pin 34 of the chain 32.

By virtue of the rotation of the main drive shaft 27 engendered through the intermediary of the transmission system constituted by the chains 14, 18, 21 and 26 together with the gear boxes 13 and 23 and the speed changer 17, the chains 32 and 33 are driven jointly in such a manner that the upper reaches of these chains move in the direction of the arrow A (Fig. 3) also shown as pointing downwardly in the center of Fig. 2.

As a result, that one of the pins 34b which initially was closest to the thread 55 and behind the latter (as viewed in the direction of the aforesaid arrow) engages the thread and deflects it laterally from the guide eye 57 in a manner which may best be visualized from Figs. 2 and 5 which, it must be remembered, of course, illustrate intermediate operational stages and not the initial stage although these are, for all practical purposes, exactly the same.

Concurrently with the longitudinal feed mechanism 35, the transverse feed mechanism or chain 50 is driven by the motor 12 in a unidirectional path according to arrow B (Fig. 1) through the intermediary of the transmission system constituted by the chains 14, 18, 22 and 40 together with the gear box 13, the speed changer 17 and the speed multiplier 38.

The diametral ratios of the various sprocket wheels and the relationships between the speed changer 17 and the multiplier 38 are so chosen that the movement of the chain 50 is synchronized with the movement of the chains 32 and 33 so as to bring one of the transfer pins 60 to 64 (see Figs. 4 and 5) into position, adjacent the chain 33, for contact of its thread-engaging groove (such as 63a) with that part of the laterally deflected portion 55b of the thread 55, then extending along the space between the first pin 34b, which initially engaged the thread, and the next pin 34b.

Upon continued movement of the chain 50 and the chains 32 and 33, while the thread end 55a is being held by the operator or by any other suitable means, the transfer pin which has engaged the thread portion 55b draws the same into a loop about the first pin 34b and across the space between the chains 32 and 33. The chain 50, of course, moves much more rapidly than the chains 32 and 33 in order to ensure that the transfer pin holding the thread loop reaches the deviatory or chain-deflecting sprocket 45 just as the chains 32 and 33 have been advanced a distance equal to the interval between two adjacent pins 34 on the one hand and two adjacent pins 34b on the other hand.

As may be seen from Figs. 6 and 7, when the chain 50 and the respective thread-engaging transfer pin are deflected from their rectilinear unidirectional path of movement around the sprocket wheel 45, the thread loop passing around the transfer pin 63 falls out of the groove 63a thereof and onto the pin 34 located directly beneath the same at that instant.

At the same time, of course, the next one of the transfer pins 60 to 64 has been brought by the chain 50 into position for engaging the deflected portion 55b of the thread 55 and looping the same about the next pin 34b so as to pass between the latter and the third pin 34b, whereafter the transfer pin draws the second loop toward and across the chain 32 where it is dropped onto the next pin 34 through the operation of the sprocket wheel 45, as explained hereinabove. This procedure continues as long as desired and results in the thread 55 coursing back and forth between the chains 32 and 33 to form convolutions or courses 55a as shown in Fig. 2.

Positioned at a suitable location with respect to the longitudinal transfer mechanism 35, preferably on the machine frame 10 and below the front end of the mechanism 35 (see Fig. 3), is a rotatable shaft 70 on which is arranged a roll 71 of paper, fabric, plastic or other sheet, layer or strip material which is passed to a gumming device generally designated by the reference numeral 72. Such a gumming device, which is only schematically illustrated in Fig. 3, may consist of a reservoir or container 73 containing an adhesive or like gumming substance 74 which is applied to one surface of the strip 65 coming from the roll 71 through the intermediary of a transfer roller 66 and an applicator roller 67, the strip 65 passing between the latter and a back-up or counterpressure roller 68. The gummed strip is then passed around an idler roller 69 and upwardly at a slant through the space between the chains 32 and 33.

Also mounted in the machine frame 10 is a shaft 70a supporting a roll 71a of preferably the same material as constitutes the roll 71. The strip 72a taken from the roll 71a is guided around a roller 73b mounted on a shaft 73a journaled in the frame, and thus passes between the roller 73b and a roller 74b around which the strip 65 is passed. The roller 74b is arranged on a shaft 74a journaled in the frame and carrying a sprocket 74c to which the sprocket 29 on the shaft 27 is drivingly connected via a chain drive 29a.

The strips 72a and 65 are thus brought into surface contact with each other and frictionally gripped between the rollers 73b and 74b to be fed, upon rotation of the latter, to and between pressure rollers 76 and 77 journaled in the frame and thereafter between heating platens 78a and 78b of a heating device 78.

In operation, the free or leading ends of the strips 65 and 72a are inserted between the feed rollers 73b and 74b, the strip 65 being additionally passed between the rollers 67 and 68 of the gumming device 72. Upon starting of the motor 12, the chains 32, 33 and 50 are driven to form reinforcing thread courses 55c and to feed these toward the front end of the machine, as fully explained hereinabove, and at the same time the strips 65 and 72a are fed or drawn in the directions of the arrows C, D and E as shown in Fig. 3.

As the strip 65 passes through the gumming device 72, a layer 65a of the adhesive or gum 74 is formed on the lower one of its surfaces, whereby the strip, upon moving past the roller 69, has its gummed surface turned upwardly. The sprocket wheels 29 and 74c are so dimensioned relative to each other as to cause the rollers 73b and 74b to bring the leading edge of the adhesive layer or film 65a substantially into the front region of the plane of the upper thread-carrying reaches of the chains 32 and 33 at about the same time as the first thread course 55c.

During continued movement of the strip 65 in the direction of the arrow D, the gum or adhesive surface layer 65a contacts the transverse thread courses 55c one after the other and lifts them off the pins 34 and 34b, the thread courses sticking to the layer 65a. The so-modified strip 65 then comes into surface contact, between the rollers 73b and 74b, with the strip 72a which sticks to that portion of the gummed surface not occupied by any thread, thus forming a compound strip 75 with the thread sandwiched between the component strips. The strip 75 is additionally compressed between rollers 76 and 77 and then subjected to heat in the heating device 78, whereby the adhesive is finally set and the bonding of the strips 65 and 72a to one another completed. Of course, if a non-thermosetting adhesive is employed, the device 78 may be omitted.

The reinforced, compound strip 75 is then fed to a suitable cutting or slicing device which is not shown in Fig. 3 but is schematically illustrated in Fig. 3a. This slicing device includes at least two knives or cutters 79 and 80 spaced from one another by approximately the same distance as the width of the strip 75 for the purpose of cutting off the laterally extending loops 55d of the thread courses 55c traversing the compound strip 75. The now straight-sided strip may then be wound onto a take-up roller 81.

If desired, additional knives or cutters, such as 83 and 84, may be provided to slice the strip 75 into a plurality of narrower strips which can then be wound on individual take-up rollers similar to the roller 81 mentioned hereinabove. The completed rolls of reinforced layer material may then be packed and stored at or shipped to any predetermined destination for future use.

It will, of course, be readily appreciated that where the reinforced compound strip 75 is to be employed in a manner in which it will not be visible, for example, as an interior lining or insulation, it will not be necessary to cut the lateral loops 55d from the strip.

The apparatus or machine according to the present invention may be modified in a number of ways. Referring to Fig. 8, for example, it will be seen that the transverse courses of thread extending between the chains 32 and 33 may be formed from threads 55′ and 55″ taken from individual supply spools 53′ and 53″ and passed in alternate sequence from one chain to the other and back. A separate transfer or transverse feed mechanism similar to the mechanism 50 illustrated in Figs. 1 and 2 may be employed for each of the threads 55′ and 55″.

Alternatively, a single mechanism provided with two sets of laterally spaced transfer pins 60 to 64 arranged in pairs may be employed, so that each loop of the thread 55′ formed by one of the transfer pins of a particular pair of transfer pins is transported to the chain 32 and the respective thread-carrying pin 34 simultaneously with a corresponding loop of the thread 55″ formed by the associated transfer pin of said particular pair of transfer pins.

As will further be seen from Fig. 8, the respective threads intersect each other only on the chain 33 where each loop passes around two adjacent pins 34b, as a result of which the compound strip 75 will have simple loops extending from one side and compound loops extending from the other side. These loops may or may not be cut off, as desired, depending on the intended use of the finished reinforced strip.

Referring now to Fig. 9, it will be seen that the chains 32 and 33 may be arranged angularly with respect to one another so as to diverge in the direction of feed of the thread 55. In this embodiment of the invention, although a chain type of transverse feed mechanism (such as 50) may be employed, as in the embodiment of Figs. 1 to 3, it will be found simpler to employ as the transverse feed mechanism a swinging lever 85 mounted for reciprocal pivotal movement at 86 and driven by means of a suitable crank mechanism 87. The lever 85 is provided at its free end with an eye or guide aperture 86a through which the thread 55 is passed, enabling the lever, as it swings and pivots to and fro about its axis 86 with the eye 86a moving in a path designated by a broken line, to loop the thread alternately about the pins 34 and 34b, the speed of movement of the chains 32 and 33 being, of course, synchronized with the operation of the crank mechanism 87.

The reinforced strip 75 resulting from this embodiment of the invention will have the transverse thread courses arranged angularly or in zigzag formation, and, as before, the lateral loops extending from the sides of the finished strip 75 may be cut off or retained on the strip depending on the intended use of the same.

It is, of course, well understood that the strip or layer material 65 may consist of paper, scrim material as used for fiber lamination and the like. The layer material and the roller 69 may be disposed between the chain drives 32, 33 as seen in Fig. 9, either at an intermediate position therebetween or at the end of the chain drive, whereby the end 55e of the thread material 55 may be directly and adhesively attached to the layer material when the same is moved at an angle to pins 34, 34b and in a fashion similar to that disclosed in Fig. 3.

As reinforcing material may be employed threads or bands made of glass fiber, hemp, jute, nylon, and similar thread material.

The drive herein referred to and as disclosed in Figs. 1 and 2 may be simplified in any suitable manner and it is to be further noted that the transverse feed mechanism 50, as seen in Fig. 2, extends at any suitable angle relative to the chain drive 35, varying from about 10° to less than 90°. The magnitude of the angle will determine the speed ratio between these chain drive feed and transfer mechanisms. It is preferred to employ a transverse chain drive 50 at an angle preferably less than 90° with respect to the longitudinal chain drives 32, 33; an angle of 30° resulting in a speed ratio of about 2:1, so that the transverse chain mechanism 50 may operate at double the speed of the longitudinal chain mechanism 35.

It will be noted that the transfer pins 60 to 64 are provided with grooves (Figs. 4, 6 and 7 showing groove 63a on pin 63). The distance between pin 60 and 61 and between pin 61 and 62 etc. may be changed so that even before, say, pin 63 has deposited the looped and deflected thread portion 55b onto the respective and corresponding pin 34, pin 62 may have been advanced to such a position that it starts to form already the succeeding loop portion without consideration of the loop portion 55b to be deposited from transfer pin 63 onto pin 34 (Fig. 6), so that the looping operation of the transfer pins may be greatly increased in speed and will thus become more economical. The respective grooves of the aforesaid transfer pins will, in such instance, not permit the displacement or stripping off of the respective loop thread portion prior to the arrival of the corresponding transfer pin at the deviatory sprocket wheel 45.

It is further contemplated according to the invention to make at least one of the longitudinal chain drives, say, chain drive 33, adjustable and movable relative to the other chain drive 32 in order to conform the distance between these chain drives to respective varying widths of the carrier or strip material to be reinforced. Such variation of width of the paper or carrier strip may be readily taken into consideration in accordance with the structure schematically shown in Fig. 9 by changing the angularity of the chain drives 32, 33 relative to each other, as it is well understood.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. The combination, in a machine for continuously producing reinforced layer material, of means for guiding reinforcing thread from a supply thereof, with respective first and second conveyor means arranged in predetermined angular relation to each other and equipped with respective holder means for looping said reinforcing thread received from the thread supply onto said holder means of said first conveyor means, means deviating said holder means of said first conveyor means and depositing said looped reinforcing thread onto the holder means of said second conveyor means, to thereby obtain on the latter a plurality of thread convolutions, drive means for displacing said second conveyor means in a substantially transverse direction to said thread convolutions, a supply of layer material, means feeding said layer material in the direction of said thread convolutions, and means adhesively bonding said thread to said layer material while the latter is fed past said thread and contacts the same for incorporation in said layer material.

2. A machine for producing reinforced multi-layer material; comprising two spaced apart first conveyor means, first drive means for displacing said first conveyor means in parallel relation to each other at a constant speed in a predetermined direction of travel, guide means for introducing a loop of a single reinforcing thread to a predetermined location in the vicinity of one of said first conveyor means, second conveyor means provided with thread engaging means for engaging said single thread loop at said predetermined location, second drive means operably connected to said second conveyor means for continuously moving said thread engaging means in a continuous and unidirectional path across both of said first conveyor means and at a constant speed greater by a predetermined proportion than that of said first conveyor means so as to form said single thread loop into continuous convolutions extending in serpentine fashion across and between said two spaced apart first conveyor means, means for feeding a first layer of material between said two spaced apart first conveyor means and at least partially in a plane located substantially obliquely to the plane of said predetermined direction of travel of said first conveyor means, at a location so situated that as said first layer passes between said two first conveyor means said first layer will engage said reinforcing threads along said convolutions against a predetermined surface of said layer and consecutively lift and carry each of said convolutions simultaneously off both of said first conveyor means, means for applying an adhesive to said first layer onto said predetermined surface thereof, means for feeding a second layer of material into proximity of said predetermined surface of said first layer carrying said convolutions, and means for bonding said second layer of material to said surface of said first layer.

3. A machine for producing reinforced multi-layer material; comprising two spaced apart first conveyor means, first drive means for displacing said first conveyor means at a constant speed in a predetermined direction of travel, guide means for introducing a loop of reinforcing thread to a predetermined location in the vicinity of one of said first conveyor means, second conveyor means provided with thread engaging means for engaging said loop of said thread at said predetermined location, second drive means operably connected to said second conveyor means for continuously moving said thread loop engaging means in one predetermined direction across both of said first conveyor means and at a constant speed greater by a predetermined proportion than that of said first conveyor means so as to form said thread loop into continuous convolutions extending parallel to each other across and between said two spaced apart first conveyor means in serpentine fashion around said engaging means, means for feeding a first layer of material between said two spaced apart first conveyor means and at least partially in a plane located substantially obliquely to the plane of said predetermined direction of travel of said first conveyor means, at a location so situated that as said first layer passes between said two first conveyor means said first layer will engage said parallel reinforcing threads along said convolutions against a predetermined surface of said layer and consecutively lift and carry each of said convolutions simultaneously off both of said first conveyor means, means for feeding a second layer of material into proximity of said predetermined surface of said first layer carrying said convolutions, and means for bonding said second layer of material to said surface of said first layer with said parallel reinforcing threads sandwiched therebetween.

4. A machine for producing reinforced multilayer material comprising a framework, first chain means constituting a longitudinal feed mechanism and including two substantially parallel endless chain conveyors each carrying spaced apart thread means engaging pins fixed to and laterally extending beyond said chain conveyors, second chain means constituting a transverse feed mechanism and located above and near one end of said first chain means, said second chain means including an endless unidirectionally movable chain conveyor carrying spaced apart transfer pins each provided with a circumferential groove near the free end thereof, said first chain means and said second chain means being supported by said framework, supply means mounted on said framework for delivering reinforcing thread means to said transverse feed mechanism so that the latter deposits said thread means from said transfer pins to said thread means engaging pins of said longitudinal feed mechanism successively, sprocket wheels over which said chain conveyor of said transverse feed mechanism is trained thereby to determine the path of said transverse thread feed mechanism, one of said sprocket wheels being positioned above one of said two chain conveyors of said longitudinal thread feed mechanism and at a location of said framework opposite to the location of said supply means, guide means for conducting said thread means from said supply means to one of said transfer pins whereby looping of said thread means about a predetermined transfer pin takes place, said predetermined transfer pin during said unidirectional movement of said transverse thread feed mechanism being deviated by said one sprocket wheel so that said looped thread means will be disengaged from said circumferential groove of said one transfer pin and will be deposited about an adjacent thread means engaging pin of said longitudinal thread feed mechanism directly therebelow, means for feeding a first layer of material between said two parallel chain conveyors and at least partially in a plane located substantially obliquely to the plane of travel of said first chain means and at a location thereof so that as said first layer of material passes between said two parallel chain conveyors whereby said first layer will engage said thread means on said thread means engaging pins and will consecutively lift and carry said thread means of said thread means engaging pins of said first chain means, means for applying an adhesive onto a predetermined surface of said first layer of material, means for feeding a second layer of material into proximity of said predetermined surface of said first layer of material, and means for bonding said second layer of material to said surface of said first layer of material with said thread means sandwiched therebetween.

References Cited in the file of this patent

UNITED STATES PATENTS

| | | |
|---|---|---|
| 1,169,895 | Wendler | Feb. 1, 1916 |
| 1,195,949 | Carney | Aug. 22, 1916 |
| 1,211,851 | Howard | Jan. 9, 1917 |
| 2,075,672 | Stark | Mar. 30, 1937 |
| 2,548,467 | Crise | Apr. 10, 1951 |
| 2,548,468 | Crise | Apr. 10, 1951 |
| 2,812,797 | Estee et al. | Nov. 12, 1957 |

FOREIGN PATENTS

| | | |
|---|---|---|
| 675,023 | Great Britain | July 2, 1952 |